US012674893B2

(12) United States Patent　　　　(10) Patent No.:　US 12,674,893 B2
Sleewaegen et al.　　　　　　　　　(45) Date of Patent:　　　　Jul. 7, 2026

---

(54) METHOD FOR DETERMINING THE HALF-CYCLE AMBIGUITY OF A GNSS CARRIER PHASE

(71) Applicant: SEPTENTRIO N.V., Leuven (BE)

(72) Inventors: Jean-Marie Sleewaegen, Jette (BE); Dries Schellekens, Berchem (BE)

(73) Assignee: SEPTENTRIO N.V., Leuven (BE)

( * ) Notice: Subject to any disclaimer, the term of this patent is extended or adjusted under 35 U.S.C. 154(b) by 246 days.

(21) Appl. No.: 18/699,542

(22) PCT Filed: Oct. 6, 2022

(86) PCT No.: PCT/EP2022/077759
§ 371 (c)(1),
(2) Date: Apr. 8, 2024

(87) PCT Pub. No.: WO2023/061836
PCT Pub. Date: Apr. 20, 2023

(65) Prior Publication Data
US 2024/0402348 A1　　Dec. 5, 2024

(30) Foreign Application Priority Data

Oct. 11, 2021　(EP) .................................... 21201807

(51) Int. Cl.
*G01S 19/04*　　　(2010.01)
*G01S 19/37*　　　(2010.01)
*G01S 19/55*　　　(2010.01)
(52) U.S. Cl.
CPC .............. *G01S 19/04* (2013.01); *G01S 19/37* (2013.01); *G01S 19/55* (2013.01)
(58) Field of Classification Search
CPC ........... G01S 19/04; G01S 19/37; G01S 19/55
(Continued)

(56) References Cited

U.S. PATENT DOCUMENTS 5,134,407 A　　7/1992　Lorenz et al.
5,535,278 A　　7/1996　Cahn et al.
(Continued)

FOREIGN PATENT DOCUMENTS

KR　　　100376657 B1　*　3/2003　............. G01S 19/20

OTHER PUBLICATIONS

Borio. "Squaring and Cross-correlation Codeless Tracking: Analysis and Generalisation," IET Radar, Sonar and Navigation, Revised on Sep. 3, 2011, doi: 10.1049/iet-rsn.2011.0235 (Year: 2011).*
(Continued)

*Primary Examiner* — Samarina Makhdoom
(74) *Attorney, Agent, or Firm* — Kolitch Romano Dascenzo Gates LLP

(57)　　　　　ABSTRACT

Signals $L_{1CA}$, $L_{1P}$, $L_{2P}$ and $L_{2C}$ transmitted by a GPS satellite are received and the carrier phases $\varphi_{LCA}$ and $\varphi_{L2C}$ are estimated from $L_{1CA}$ and $L_{2C}$. The cross-correlation P between the downconverted signals $L_{1P}$ and $L_{2P}$ is determined, taking into account the delay between signals. The sign of P is used to enable direct determination of the half-cycle ambiguity $A_{L1CA}$ of the $L_{1CA}$ signal. In some examples, this is done by downconverting the $L_{2P}$ signal by a replica having a phase derived from $\varphi_{L2C}$, instead of determining the phase of the $L_{2P}$ replica by a tracking loop, enabling determination of $A_{L1CA}$ directly from the sign of P. In some examples, the phase $\varphi_{L2P}$ of the $L_{2P}$ replica is determined by a tracking loop, and the half-cycle ambiguity $A_{L1CA}$ is determined based on the sign of P and on the difference between the carrier phases $\varphi_{L2P}$ and $\varphi_{L2C}$.

15 Claims, 6 Drawing Sheets

(58) Field of Classification Search
USPC .................................................... 342/357.27
See application file for complete search history.

(56) References Cited

U.S. PATENT DOCUMENTS

| | | | |
|---|---|---|---|
| 5,847,680 A | 12/1998 | McBurney | |
| 6,061,390 A | 5/2000 | Meehan et al. | |
| 6,150,978 A | 11/2000 | McBurney | |
| 2015/0369924 A1* | 12/2015 | Hedgecock ............. | G01S 19/51 |
| | | | 342/357.34 |
| 2017/0254904 A1* | 9/2017 | Zhodzishsky ........... | G01S 19/44 |

OTHER PUBLICATIONS

International Search Report and Written Opinion of the International Searching Authority from the European Patent Office, in PCT/EP2022/077759 dated Jan. 5, 2023, which is an international application to which this application claims priority.

Psiaki, Mark L., et al.,; "Tracking L1 C/A and L2C Signals through lonospheric Scintillations" GNSS 2007—Proceedings of the 20th International Technical Meeting of the Satellite Division of the Institute of Navigation (ION GNSS 2007), Sep. 2007.

Son et al., "A new half cycle ambiguity resolution method for GPS attitude determination system," Proceedings of the 13th International Technical Meeting of the Satellite Division of The Institute of Navigation (ION GPS 2000), Salt Lake City, UT, obtained at https://www.ion.org/publications/abstract.cfm?articleID=1639, Sep. 2000.

Woo, K. T., "Optimum Semi-Codeless Carrier Phase Tracking of L2," Proceedings of the 12th International Technical Meeting of the Satellite Division of The Institute of Navigation (ION GPS 1999), Nashville, TN, obtained at https://scholar.google.com/scholar?q=Woo,+K.+T.,+%22Optimum+Semi-Codeless+Carrier+Phase+Tracking+of+L2&hl=en&as_sdt=0&as_vis=1&oi=scholart, Sep. 1999.

Psiaki, Mark L., et al.; "Tracking L1 C/A and L2C Signals Through lonospheric Scintillations" Cornell University, Ion Gnss 20th International Technical Meeting of the Satellite Division, Sep. 25-28, 2007.

Son, Seok Bo, et al.; "A new half cycle ambiguity resolution method for GPS attitude determination system" Chungnam National University, ION GPS 2000, Sep. 19-22, 2000.

Woo, K.T., "Optimum Semi-Codeless Carrier Phase Tracking of L2" NavCom Technology, Inc.; 12th International Technical Meeting of the Satellite Division of the Institute of Navigation, Sep. 14-17, 1999.

Li, Zhenya, et al.; "A Half-cycle Ambiguity Resolution Method Designed for DBT Technique", Proceedings of the 28th International Technical Meeting of the Satellite Division of The Institute of Navigation; obtained at https://www.ion.org/publications/abstract.cfm?articleID=12984; Sep. 2015.

* cited by examiner

METHOD FOR DETERMINING THE HALF-CYCLE AMBIGUITY OF A GNSS CARRIER PHASE

FIELD

The present disclosure is related to global navigation satellite systems (GNSS). The present disclosure is in particular related to the problem of the half-cycle ambiguity of the carrier phase of a satellite signal that is modulated by a navigation sequence.

BACKGROUND

Global Navigation Satellite Systems (GNSS) are widely used to provide position, velocity and time to any user on or near the Earth's surface. A GNSS comprises, among other things, a constellation of multiple navigation satellites (GNSS satellites) which transmit dedicated navigation signals known as "ranging signals". Most known is the Global Positioning System (GPS) developed by the United States. Other systems include the European Galileo system, the Russian GLONASS and the Chinese BeiDou system.

All GNSS satellites transmit multiple ranging signals in various frequency bands. For example, modern GPS satellites transmit at least two signals modulated on the L1 carrier at 1575.42 MHZ ($L_{1CA}$ and $L_{1P}$) and two signals on the L2 carrier at 1227.6 MHz ($L_{2P}$ and $L_{2C}$). Each signal consists of a pseudorandom code (PRN code) unique to each satellite. Some signals, known as "data signals", are further modulated by the bits of a navigation message. The signals that are not modulated by navigation bits are called "pilot signals". In GPS for example, the $L_{2C}$ signal is a pilot signal (or more precisely, the $L_{2CL}$ component of the $L_{2C}$ signal is a pilot), while the $L_{1CA}$, $L_{1P}$ and $L_{2P}$ signals are data signals. For most signals, the PRN code is publicly available and known to the receiver. However, for some signals, such as GPS $L_{1P}$ and $L_{2P}$, the PRN code is classified and unknown.

In GNSS receivers, the different frequency bands are first amplified and downconverted to baseband in analog frontend circuits, and the signals from the different satellites are acquired and tracked in dedicated tracking channels. For each tracked signal of each satellite, the receiver measures the transmission delay from the satellite to the receiver and the phase of the incoming carrier wave. The measured delay, multiplied by the speed of light, is called the pseudorange. The carrier phase measurements are much more accurate than the pseudoranges but are affected by an ambiguity of an integer number of carrier wavelengths.

The phenomenon of integer ambiguity and the techniques to overcome it are well-known in the art. The present disclosure relates to the problem of half-cycle ambiguity that affects the carrier phase measurements of data signals, as explained in the following paragraphs.

In data signals, the navigation bit modulation follows the binary phase-shift keying (BPSK) scheme, in which the phase of the carrier is offset by 0° or 180° (one half of a carrier cycle) depending on the value of the bit to be transmitted (1 or 0). In such a modulation scheme, a global shift of the unmodulated carrier by 180° is not distinguishable from an inversion of all the navigation bits. For example, upon receiving the phase sequence (0°, 180°, 180°, 0°) 0°, the receiver cannot distinguish the hypothesis that the unmodulated carrier phase was 0° and the navigation bits were (0, 1, 1, 0, 0), from the hypothesis that the carrier phase was 180° with navigation bits (1, 0, 0, 1, 1). An ambiguity of 180° exists until the receiver can determine the correct bit sequence. This ambiguity is referred to as the "half-cycle ambiguity".

Resolving the half-cycle ambiguity typically involves waiting for the occurrence of a preamble (a short bit sequence transmitted at fixed intervals, the content of which is known in advance) and comparing it with the decoded sequence. In case of a sign inversion (the bits of the preamble have been decoded with inverted polarity), the receiver adjusts its carrier phase by 180°. In case of a match, the carrier phase is confirmed and does not need to change. This process must restart after each loss of tracking (i.e. after each signal interruption).

Even when the half-cycle ambiguity has been resolved, it may be lost again during tracking, especially in case of weak signal reception. Such event is known in the art as a "half-cycle slip". Half-cycle slips are difficult to detect until the next preamble is received. During that interval, the carrier phase measurements are incorrect by half a cycle.

As the availability of carrier phase with integer ambiguity is key to high-accuracy positioning, there is a need for techniques to speed up the resolution of the half-cycle ambiguity affecting data signals.

Numerous cycle-slip detection and repair algorithms have been proposed involving detecting the presence of discontinuities in the phase measurements. These methods usually compare the detected carrier phase with a modelled value being obtained from past data, e.g. by extrapolation. They require the availability of recent data as the extrapolation quickly diverges. For this reason, they are not suitable to determine the initial half-cycle ambiguity, as in this case, the last time a given satellite was tracked may be hours ago. There is a need for a technique that can be applied independently of the time at which a given satellite was last seen.

Patent publication document U.S. Pat. No. 6,150,978 discloses a technique for quick half-cycle ambiguity resolution applicable to the GPS $L_{1CA}$ signal. The technique involves detecting a match or an inverted match between an internally stored expected data message and the incoming data. It requires memory buffers for storing past data and relies on the assumption that the navigation message transmitted by the satellite does not change often. Periodic refreshes of the memory buffer are needed to keep track of navigation message updates, and the technique cannot be applied during those refreshes.

Son et al., "A new half cycle ambiguity resolution method for GPS attitude determination system," Proceedings of the 13th International Technical Meeting of the Satellite Division of The Institute of Navigation (ION GPS 2000), Salt Lake City, UT, September 2000, pp. 2227-2232, propose a method to resolve the half-cycle ambiguity by comparing data sequences from multiple antennas. The method uses the fact that demodulated data sequences from multiple antennas are identical for the same satellite. This technique is not applicable to a single-antenna configuration, and, in multi-antenna systems, is ineffective in the most usual case where the signal interruption concerns all antennas.

Patent publication document U.S. Pat. No. 6,061,390 discloses a way to resolve the half-cycle ambiguity on the GPS $L_{1P}$ and $L_{2P}$ carrier phase measurements provided the half-cycle ambiguity is resolved on the GPS $L_{1CA}$ carrier phase. However, the resolution of the GPS $L_{1CA}$ half-cycle ambiguity is still based on testing the sign of the preamble, as described above.

SUMMARY

The present disclosure aims to provide a solution to the problems described above. This aim is achieved by the methods and the GPS receivers as disclosed in the appended claims. According to the present disclosure, the four signals $L_{1CA}$, $L_{1P}$, $L_{2P}$ and $L_{2C}$ transmitted by a GPS satellite are received and the carrier phases $\varphi_{LCA}$ and $\varphi_{L2C}$ are estimated from $L_{1CA}$ and $L_{2C}$, e.g. in a manner known in the art. In addition, the cross-correlation P between the downconverted signals $L_{1P}$ and $L_{2P}$ is determined, taking into account the delay between said signals. According to the present disclosure, the sign of P is used in a novel way that enables the direct determination of the half-cycle ambiguity $A_{L1CA}$ of the $L_{1CA}$ signal. According to a first embodiment, this is done by downconverting the $L_{2P}$ signal by a replica having a phase derived from $\varphi_{L2C}$, instead of determining the phase of the $L_{2P}$ replica by a tracking loop as in the prior art. This new approach enables determining $A_{L1CA}$ directly from the sign of P. According to a second embodiment, the phase $\varphi_{L2P}$ of the $L_{2P}$ replica is determined by a tracking loop as in the prior art, and the half-cycle ambiguity $A_{L1CA}$ is determined on the basis of the sign of P and on the basis of the difference between the carrier phases $\varphi_{L2P}$ and $\varphi_{L2C}$. The present disclosure is equally related to a GPS receiver comprising at least one channel configured for executing the method according to the present disclosure.

The present disclosure is in particular related to a method for determining the half-cycle ambiguity of a Global Positioning System (GPS) carrier phase comprising the steps of:
  receiving the following signals from a GPS satellite:
    a first signal $L_{1CA}$ transmitted on a first carrier frequency $f_{L1}$,
    a second signal $L_{1P}$ transmitted on the first carrier frequency $f_{L1}$ the second signal having a known phase offset $\delta\varphi_{L1P,CA}$ with respect to the first signal,
    a third signal $L_{2C}$ transmitted on a second carrier frequency $f_{L2}$,
    a fourth signal $L_{2P}$ transmitted on the second carrier frequency $f_{L2}$, the fourth signal having a known phase offset $\delta\varphi_{L2P,C}$ with respect to the third signal,
  tracking the first signal and the third signal and determining thereby respective estimations of the carrier phases $\varphi_{L1CA}$ and $\varphi_{L2C}$ of said first and third signals, wherein said estimation of the carrier phase $\varphi_{L1CA}$ of the first signal comprises the term $A_{L1CA}\cdot\pi$, wherein $A_{L1CA}$ is equal to 0 or 1, $A_{L1CA}$ being referred to hereafter as the half-cycle ambiguity of the $L_{1CA}$ carrier phase,
  downconverting the second and fourth signals $L_{1P}$ and $L_{2P}$ to baseband by multiplication with a carrier replica of said second and fourth signals, determining the delay between the downconverted second and fourth signals, and determining a cross-correlation P between the downconverted second and fourth signals by integrating the product of the downconverted second and fourth signals over an integration time T, taking into account said delay,
characterized in that the sign of the cross-correlation P and the known phase offsets $\delta\varphi_{L2P,C}$ and $\delta\varphi_{L1P,CA}$ are used for determining the half-cycle ambiguity $A_{L1CA}$.

According to an embodiment, the half-cycle ambiguity $A_{L1CA}$ of the first signal $L_{1CA}$ is determined by:
  executing said step of downconverting the fourth signal $L_{2P}$ by multiplication of the fourth signal $L_{2P}$ with a carrier replica having the phase $\varphi_{L2}t+\varphi_{L2C}+\delta\varphi_{L2P,C}$, with $\omega_{L2}=2\pi f_{L2}$
  determining the half-cycle ambiguity $A_{L1CA}$ of the $L_{1CA}$ signal directly from the sign of the cross-correlation P, according to the following verification steps:
    if P is positive, $A_{L1CA}=0$,
    if P is negative, $A_{L1CA}=1$.

In the previous embodiment, the applied delay between the downconverted second and fourth signals may be determined by a delay lock loop (DLL) circuit (15) tracking the delay between $L_{1P}$ and $L_{2P}$.

Alternatively, the step of tracking the first signal and the third signal may include determining respective estimations $R_{L1CA}$ and $R_{L2C}$ of the satellite range, wherein the applied delay between the downconverted second and fourth signals is the difference between the respective estimations of the satellite range obtained from the third and first signals $L_{2C}$ and $L_{1CA}$, divided by the speed of light, i.e. ($PR_{L2C}-PR_{L1CA}$)/c.

According to another embodiment, the half-cycle ambiguity $A_{L1CA}$ of the first signal $L_{1CA}$ is determined by:
  tracking the carrier phase $\varphi_{L2P}$ of the fourth signal by a tracking loop that maximizes the amplitude of the cross-correlation P, and executing said step of downconverting the fourth signal by multiplication of the fourth signal with a carrier replica having the phase $\omega_{L2}t+\varphi_{L2P}$,
  from the sign of the cross-correlation P, and from the difference between $\varphi_{L2P}$ and $\varphi_{L2C}$, determining the half-cycle ambiguity $A_{L1CA}$ of the first signal $L_{1CA}$ according to the following steps:
  determining a parameter D,
  with $$D = \frac{1}{\pi}\left(\varphi_{L2P} - \varphi_{L2C} - \delta\varphi_{L2P,C}\right)$$

if the integer closest to D is even: $A_{L1CA}=0$ if P>0 or $A_{L1CA}=1$ if P<0
  if the integer closest to D is odd: $A_{L1CA}=1$ if P>0 or $A_{L1CA}=0$ if P<0.

The method according to the previous embodiment may further comprise the step of determining whether the absolute value of the difference between D and the closest integer is larger or smaller than a pre-defined threshold value $D_{th}$, wherein the step of determining the half-cycle ambiguity $A_{L1CA}$ of the $L_{1CA}$ signal is executed only if the absolute value of the difference between D and the closest integer is smaller than the pre-defined threshold value $D_{th}$.

The method according to the present disclosure may further comprise the step of determining whether the absolute value of P is larger than a pre-defined threshold value $P_{th}$, and wherein the step of determining the half-cycle ambiguity $A_{L1CA}$ of the $L_{1CA}$ signal is executed only if $|P|>P_{th}$.

The method according to the present disclosure may be performed repeatedly so as to enable an essentially continuous monitoring of the half cycle ambiguity $A_{L1CA}$.

According to an embodiment, the half-cycle ambiguity $A_{L1CA}$ is determined only if the same result is obtained a given number of times.

According to an embodiment, the method of the present disclosure is performed repeatedly and in parallel with a method for determining the half-cycle ambiguity $A_{L1CA}$ on the basis of a preamble transmitted in the first signal and wherein the time between two consecutive determinations of the half-cycle ambiguity is smaller than the time between two consecutive preambles.

According to an embodiment, the time between two consecutive determinations of the half-cycle ambiguity is smaller than 6 s.

The present disclosure is equally related to the use of the method of the present disclosure for detecting half-cycle slips during the acquisition and processing of GPS signals.

The present disclosure is equally related to a GPS receiver comprising one or more receiver channels, each channel being configured for tracking the following signals from a GPS satellite:

a first signal $L_{1CA}$ transmitted on a first carrier frequency $f_{L1}$, a second signal $L_{1P}$ transmitted on the first carrier frequency $f_{L1}$, the second signal having a known phase offset $\delta\varphi_{L1P,CA}$ with respect to the first signal, a third signal $L_{2C}$ transmitted on a second carrier frequency $f_{L2}$, a fourth signal $L_{2P}$ transmitted on the second carrier frequency $f_{L2}$, the fourth signal having a known phase offset $\delta\varphi_{L2P,C}$ with respect to the third signal wherein at least one of said channels comprises a half-cycle ambiguity calculation unit configured to calculate the half-cycle ambiguity $A_{L1CA}$ of the $L_{1CA}$ signal in accordance with the method according to the present disclosure.

BRIEF DESCRIPTION OF THE DRAWINGS

Aspects of the present disclosure will now be described in more detail with reference to the appended drawings, wherein same reference numerals illustrate same features.

DETAILED DESCRIPTION

Figure 1:
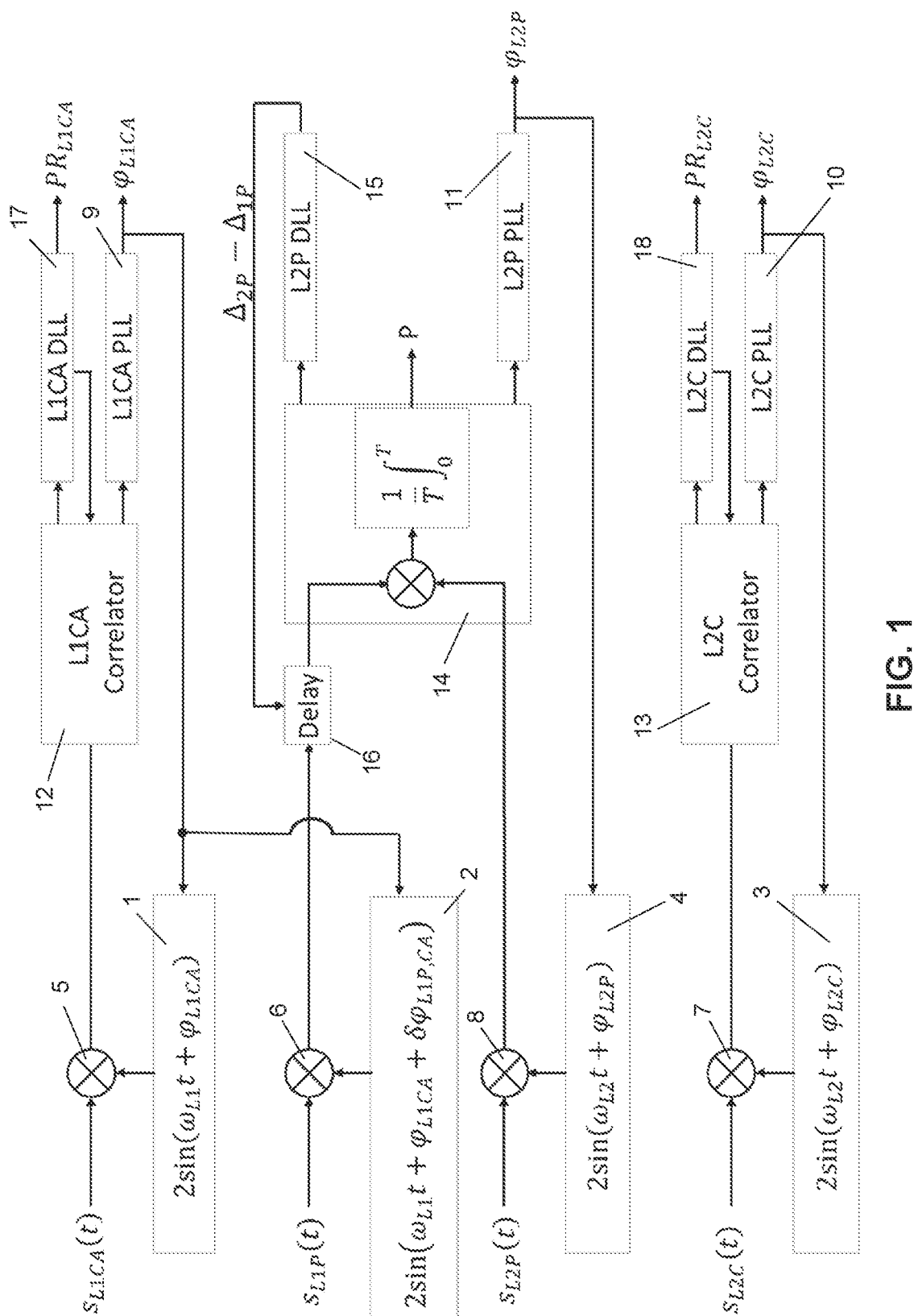
FIG. 1 illustrates the high-level architecture of a receiver channel of a GPS receiver as presently known in the art. With high level is meant that only the basic components and their interaction is illustrated, while no details of the components as such are included in the drawing.

During the reception of the k-th navigation bit, the $L_{1CA}$, $L_{1P}$, $L_{2P}$ and $L_{2C}$ signals received from a GPS satellite can be represented as:

$$s_{L1CA}(t) = G_{L1CA} \cdot D_{L1CA,k} \cdot PRN_{L1CA}(t - \Delta_{1CA}) \cdot \sin(\omega_{L1} t + \Phi_{L1}) \quad (1)$$

$$s_{L1P}(t) = G_{L1P} \cdot D_{P,k} \cdot PRN_P(t - \Delta_{1P}) \cdot \sin(\omega_{L1} t + \Phi_{L1} + \delta\varphi_{L1P,CA})$$

$$s_{L2C}(t) = G_{L2C} \cdot 1 \cdot PRN_{L2C}(t - \Delta_{2C}) \cdot \sin(\omega_{L2} t + \Phi_{L2})$$

$$s_{L2P}(t) = G_{L2P} \cdot D_{P,k} \cdot PRN_P(t - \Delta_{2P}) \cdot \sin(\omega_{L2} t + \Phi_{L2} + \delta\varphi_{L2P,C})$$

Where $D_{i,k}$ is the sign of the k-th bit transmitted on signal i ($D_{i,k}$ can take value −1 or +1), $PRN_i(t)$ is the PRN code that the satellite uses on signal i, which is a sequence of −1 and +1 "chips" at a high chipping rate and $\omega_{Li}$ is the angular frequency of the L1 and L2 carriers, i.e. $\omega_{L1} = 2\pi f_{L1}$ and $\omega_{L2} = 2\pi f_{L2}$ with $f_1 = 1575.42$ MHZ and $f_2 = 1227.6$ MHz. $G_i$ is the amplitude of signal i, accounting for the various gains in the transmission and reception chain. $\delta\varphi_{L1P,CA}$ is the phase offset between the $L_{1P}$ and $L_{1CA}$ signals and $\delta\varphi_{L2P,C}$ is the phase offset between the $L_{2P}$ and $L_{2C}$ signals. Typically, both offsets $\delta\varphi_{L1P,CA}$ and $\delta\varphi_{L2P,C}$ are equal to $\pi/2$, but other values are possible. These offsets are deliberately applied to the signals generated by the satellites and are therefore known and documented in the GPS Interface Specification (IS-GPS-200). $\Delta_i$ is the delay of signal i in its propagation from the satellite to the receiver. It is different for all signals due to the dispersive effect of the ionosphere and to satellite and receiver inter-signal delays. $\Phi_{Li}$ is the phase shift of the L1 and L2 carrier in its propagation from the satellite to the receiver.

It is known in the art that the $L_{2C}$ signal comprises a medium length data-modulated code (CM) and a long length dataless code (CL). In equations (1) and further in this text, only the $L_{2CL}$ component of the $L_{2C}$ signal is considered, even though we refer to it as "$L_{2C}$" for clarity. As $L_{2C}$ is a pilot signal, it has no bit modulation. The $L_{1P}$ and $L_{2P}$ PRN codes ($PRN_P$) and bits ($D_{P,k}$) are classified and considered unknown here. However, they are the same for $L_{1P}$ and $L_{2P}$.

The equations (1) therefore represent the mathematical formulas of the four following signals:

a first signal $L_{1CA}$ transmitted on a first carrier frequency $f_{L1}$, with $\omega_{L1} = 2\pi f_{L1}$, that is modulated by a first known PRN code and by a first navigation bit sequence, a second signal $L_{1P}$ transmitted on the first carrier frequency $f_{L1}$ that is modulated by an unknown PRN code and by an unknown navigation bit sequence, the second signal having a known phase offset $\delta\varphi_{L1P,CA}$ with respect to the first signal, a third signal $L_{2C}$ transmitted on a second carrier frequency $f_{L2}$, with $\omega_{L2} = 2\pi f_{L2}$, that is modulated by a second known PRN code, a fourth signal $L_{2P}$ transmitted on the second carrier frequency $f_{L2}$, that is modulated by said unknown PRN code and by said unknown navigation sequence, the fourth signal having a known phase offset $\delta\varphi_{L2P,C}$ with respect to the third signal.

According to the state of the art, the high-level architecture of a receiver channel tracking the four signals of equations (1) is represented in FIG. 1. The receiver channel is dedicated to tracking one particular satellite. The receiver comprises therefore multiple channels, one for each satellite of the global positioning system.

The 4 signals of equation (1) are brought to baseband by mixing with sine waves 1 through 4, in multiplication circuits 5 through 8. The phases of the respective sine waves 1, 3 and 4 are derived from the output of phase-lock loop (PLL) circuits 9, 10 and 11. These outputs are the carrier phase measurements $\varphi_{L1CA}$, $\varphi_{L2P}$ and $\varphi_{L2C}$ for respective signals $L_{1CA}$, $L_{2C}$ and $L_{2P}$. For the $L_{1P}$ signal, the phase is made equal to the $L_{1CA}$ phase plus the known $L_{1P}$–$L_{1CA}$ phase offset $\delta\varphi_{L1P,CA}$ The PLLs 9 and 10 determine the carrier phase measurements $\varphi_{L1CA}$ and $\varphi_{L2C}$ by maximizing the in-phase correlation between the downconverted signal and a locally produced replica of said signal, said correlation being produced by respective correlators 12 and 13. The $L_{2P}$ PLL 11 determines the carrier phase $\varphi_{L2P}$ of the $L_{2P}$ signal by maximizing the in-phase cross-correlation P between the downconverted signals $L_{1P}$ and $L_{2P}$, determined in a P1-P2 cross-correlator circuit 14, after compensation of the delay $\Delta_{2P}$–$\Delta_{1P}$ between the $L_{1P}$ and $L_{2P}$ signals, said delay being determined by delay-lock loop (DLL) 15. The measured delay is applied to the incoming signal in a delay circuit 16.

DLL circuits 17 and 18 track the delay of the known PRN codes transmitted by the signals $L_{1CA}$ and $L_{2C}$ and produce the pseudorange measurements $PR_{L1CA}$ and $PR_{L2C}$ by multiplying the respective delays by the speed of light. The DLL circuits 17 and 18 determine said delays by locking a local replica of the PRN code onto the incoming signal and determining the time delay between the transmitted signal and the locally produced replica. As known in the art, this may be realized by continuously producing early, late and punctual replicas of the PRN code and comparing the correlation thereof with the incoming signal.

Assuming perfect lock of the tracking loops to the incoming signals, a receiver channel tracking the $L_{1CA}$ signal given by the first of the equations (1) produces the following carrier phase measurement, in radians:

$$\varphi_{L1CA} = \Phi_{L1} + N_{L1CA} \cdot 2\pi + A_{L1CA} \cdot \pi \qquad (2)$$

With $A_{L1CA}$ the half-cycle ambiguity of the $L_{1CA}$ carrier phase, being 0 or 1, and $N_{L1CA}$ the integer ambiguity.

As a by-product of the $L_{1CA}$ signal tracking, a receiver channel also estimates the sign of the navigation bits ($D_{L1CA, k}$). As is well known in the art, if $A_{L1CA}$ is 0, the navigation bits are decoded with correct sign. On the other hand, if $A_{L1CA}$ is 1, they are decoded with inverted sign. Known methods to resolve the half-cycle ambiguity therefore involve waiting for the occurrence of a known bit pattern and comparing it with the decoded sequence. For example, the GPS $L_{1CA}$ navigation bit stream contains a known pattern of 8 bits repeated every 6 seconds, the so-called preamble. In case of a sign inversion (the preamble has been decoded with inverted polarity), $A_{L1CA}$ is determined to be 1, otherwise it is determined to be 0.

This process must restart after each loss of tracking (i.e., after each signal interruption). For example, when the receiver is used in a car, the process of resolving the half-cycle ambiguity is repeated each time the car passes under a bridge blocking the GPS signal. After each signal interruption, it takes several seconds to resolve the half-cycle ambiguity.

This invention relates to the fast determination of the $A_{L1CA}$ ambiguity. It is based on the insight that the measured carrier phase $\varphi_{L2C}$ from the pilot $L_{2C}$ signal can be used to speed up determination of the $L_{1CA}$ half-cycle ambiguity $A_{L1CA}$, using the $L_{1P}$ and $L_{2P}$ signals as a link between L1 and L2. In particular, the sign (+ or −) of the P1-P2 cross-correlation P, determined by integration over a short time period of for example 1 second ('short' meaning shorter than the timespan between subsequent transmissions of the preamble), enables the fast determination of $A_{L1CA}$ when the measured carrier phase $\varphi_{L2C}$ is used judiciously. The inventors have found two different way of realizing this, described hereafter as a first and second embodiment of the method of the present disclosure.

First Embodiment

Assuming perfect lock of the tracking loops to the signals, a receiver channel tracking the $L_{1CA}$ and $L_{2C}$ signals given by equations (1) produces the following carrier phase measurements:

$$\varphi_{L1CA} = \Phi_{L1} + N_{L1CA} \cdot 2\pi + A_{L1CA} \cdot \pi \qquad (3)$$

$$\varphi_{L2C} = \Phi_{L2} + N_{L2C} \cdot 2\pi$$

As stated above, formula (3) assumes perfect lock of the tracking loops to the incoming signals. In reality, the carrier phase measurements may slightly differ from the above formulas due for example to noise or multipath effects, but these deviations may be considered to be small compared to the terms cited in equations (3). In any case, the estimation of $\varphi_{L1CA}$ comprises the term $A_{L1CA} \cdot TT$ that is equal to 0 or IT depending on the value (0 or 1) of the half-cycle ambiguity $A_{L1CA}$. Another way of defining the half-cycle ambiguity would be to define it as the cited term itself, i.e. as equal to 0 or TT. This definition of the half-cycle ambiguity is equivalent to the definition used in this description and in the appended claims.

$L_{2C}$ being a pilot signal, its carrier phase measurement is by design free of half-cycle ambiguity (but it is still affected by an integer ambiguity, $N_{L2C}$, as all carrier phase measurements). In equation (3), there is apparently no link between the $L_{1CA}$ and $L_{2C}$ carrier phase. However, a link can be made using the fact that both the L1 and L2 carriers are also modulated by the $L_{1P}$ and $L_{2P}$ signals.

Figure 2:
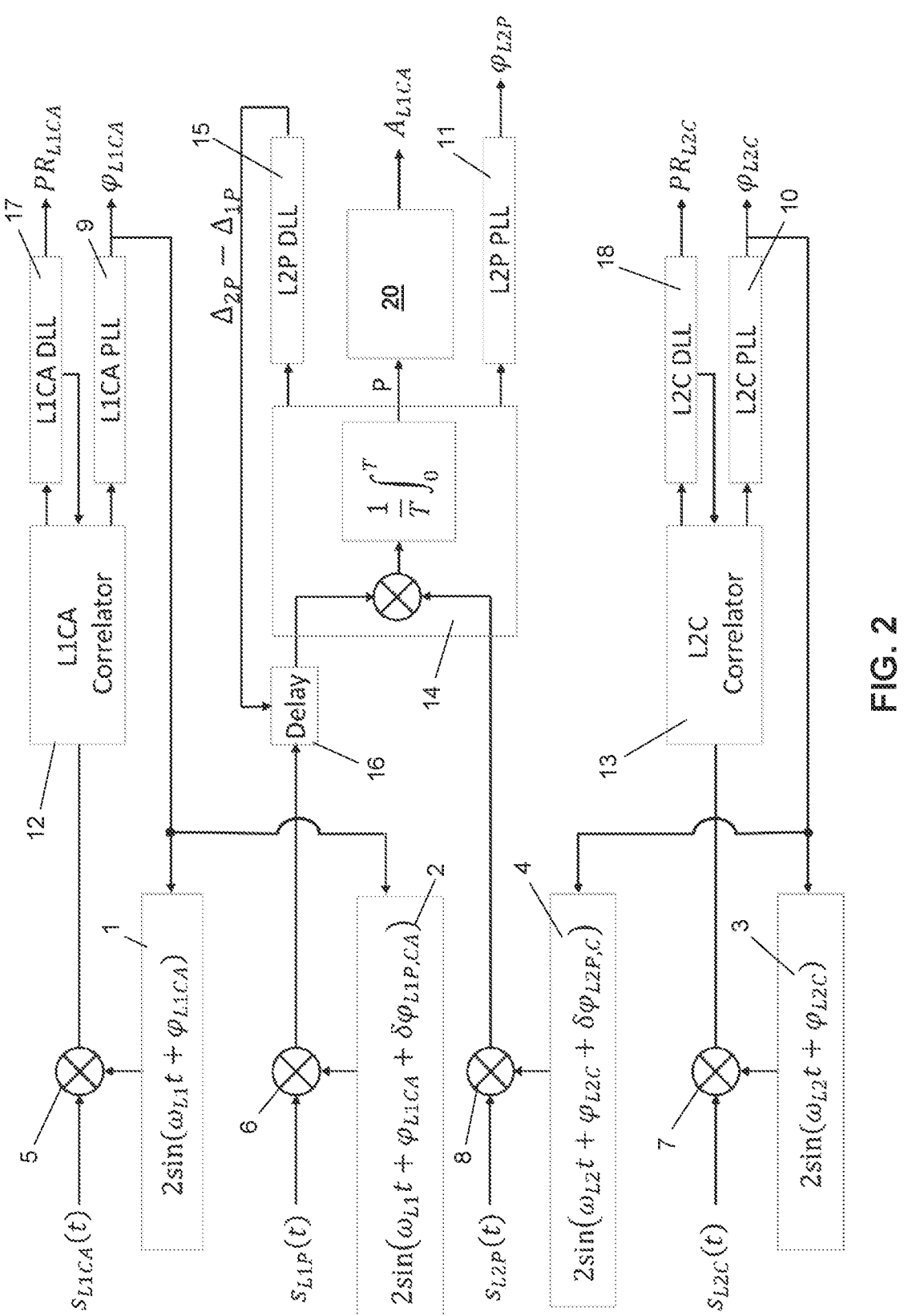
FIGS. 2 and 3 illustrate two possible high-level architectures of a receiver channel of a GPS receiver applicable for realizing the method according to the first embodiment.

In the prior art receiver channel of FIG. 1, the $L_{2P}$ signal is brought to baseband using the phase $\varphi_{L2P}$, which is the output of the $L_{2P}$ PLL. Instead, in this invention, the $L_{2P}$ signal is converted to baseband by mixing with a sine wave of which the phase is derived from the measured $L_{2C}$ phase $\varphi_{L2C}$ of equation (3). The principle is illustrated in FIG. 2.

The $L_{2P}$ signal is downconverted to baseband using the measured $L_{2C}$ carrier phase $\varphi_{L2C}$ and the known $L_{2P}$–$L_{2C}$ phase offset $\delta\varphi_{L2P,C}$. As in the prior art receiver, the $L_{1P}$ signal is downconverted to baseband using the measured $L_{1CA}$ carrier phase $\varphi_{L1CA}$ and the known $L_{1P}$–$L_{1CA}$ phase offset $\delta\varphi_{L1P,CA}$. The baseband signals are then multiplied and integrated over a time T (preferably this means integrating between 0 and T and dividing the integral by T, as indicated in FIG. 1). T could for example be 1 second.

From the signal definition in equation (1) and the carrier phase equations (3), one can compute the so-called punctual in-phase cross-correlation P (neglecting the terms at twice the carrier frequency) as:

$$P = \frac{4}{T} \int_0^T G_{L1P} G_{L2P} \left( D_{P,k} PRN_P(t) \sin(\omega_{L2}t + \Phi_{L2} + \delta\varphi_{L2P,C}) \right)^2 \cdot \qquad (4)$$

$$\sin(\omega_{L1}t + \Phi_{L1} + \delta\varphi_{L1P,CA}) \cdot \sin(\omega_{L1}t + \Phi_{L1} + \delta\varphi_{L1P,CA} + A_{L1CA}\pi) \cdot dt$$

$$P = G_{L1P} G_{L2P} (1 - 2A_{L1CA})$$

The correlator circuit 14 may also output early and late cross-correlation values to the DLL 15 and in-quadrature cross-correlation values to the PLL 11. In the context of determining the half-cycle ambiguity in accordance with any embodiment of the present disclosure, only the punctual in-phase cross-correlation P is needed. In the rest of this description and in the claims, the term "cross-correlation P" is always to be interpreted as the "punctual in-phase cross-correlation".

It can be seen that P is positive when $A_{L1CA}$=0, and negative when $A_{L1CA}$=1. In other words, when the $L_{2P}$ signal is downconverted to baseband by a sinewave of phase $\omega_{L2}t + \varphi_{L2C} + \delta\varphi_{L2P,C}$ instead of $\omega_{L2}t + \varphi_{L2P}$ the sign of the cross-correlation P directly provides the value of the $L_{1CA}$ half-cycle ambiguity. According to the first embodiment of the present disclosure, the $L_{1CA}$ half-cycle ambiguity is therefore determined as follows:

if P is positive, determine that $A_{L1CA}=0$ if P is negative, determine that $A_{L1CA}=1$.

The method according to the first embodiment of the present disclosure therefore comprises the steps summarized in appended claim 2, ending with the determination of $A_{L1CA}$ based directly on the sign of P. The method is preferably performed repeatedly as the 4 signals of equations (1) are acquired and processed in the above-described way so as to enable an essentially continuous monitoring of the half-cycle ambiguity. Preferably, this means that the half-cycle ambiguity is determined essentially every T seconds. T can be for example 1s or less, and in any case T can be significantly smaller than the interval of 6s between two consecutive preamble sequences, used in prior art receivers to determine the half-cycle ambiguity. The present disclosure therefore enables a much faster determination of the half-cycle ambiguity and therefore a faster restoration of the integer-ambiguity carrier phase after an interruption or a signal slip.

In reality, the correlation P will be affected by noise. To account for noise, the decision above is preferably subject to a threshold check on P. If the value of P is under a given threshold $P_{Th}$ in absolute value, no decision is taken, and the test is performed again at the end of the next correlation interval T.

Parallel to the above procedure, a receiver channel equipped for performing the method according to the first embodiment of the present disclosure preferably still checks for the preamble sign to determine the $L_{1CA}$ half-cycle ambiguity in the known way. The $L_{1CA}$ half-cycle ambiguity is fixed as soon as at least one of the following conditions is met:

The preamble has been received and its sign could be determined,

The $L_{2C}$ signal is tracked and the $L_{1P}$-$L_{2P}$ cross-correlation P is available with sufficient amplitude.

In most cases, the $L_{2C}$-based half-cycle ambiguity fixing is faster, which is the main advantage of the present disclosure.

In a preferred embodiment, the above process of determining the $L_{1CA}$ half-cycle ambiguity is executed repeatedly to detect half-cycle slips, for example the preamble sign is checked every 6 seconds, and the sign of the cross-correlation P is checked at intervals smaller than 6 s, for example every 1 s or even less, as enabled by the fact that the integration time T can be much shorter than the 6 s interval between preambles. If the half-cycle ambiguity appears to change, a cycle-slip flag is raised and the new ambiguity is applied immediately.

The process of cross-correlating the $L_{1P}$ and $L_{2P}$ signals is well known in the art, and multiple refinements for the P1-P2 cross-correlator 14 have been proposed to improve the SNR of the cross-correlation, as for example summarized in the conference paper "Woo, K. T., "*Optimum Semi-Codeless Carrier Phase Tracking of L2*," Proceedings of the 12th International Technical Meeting of the Satellite Division of The Institute of Navigation (ION GPS 1999), Nashville, TN, September 1999, pp. 289-306.". Such refinements are applicable as such in the method and receiver according to the various embodiments of the present disclosure.

As for example disclosed in U.S. Pat. No. 5,134,407, it is known in the art that the cross-correlation SNR can be significantly improved by performing a first pre-integration over small portions of the $L_{1P}$ and $L_{2P}$ PRN code. This improvement is compatible with the present disclosure and is advantageous as it reduces the noise on the cross-correlation P.

One embodiment of a receiver channel in a receiver according to the present disclosure, configured for the application of the first embodiment of the method as described above, is shown in FIG. 2. It is seen that (besides the term $\omega_{L2}t$) the sinewave 4 is now defined by the measured carrier phase $\varphi_{L2C}$ and the known phase difference $\delta\varphi_{L2P,C}$, and that the receiver channel comprises an additional component, called the $L_{1CA}$ half-cycle ambiguity calculation unit 20, that receives the cross-correlation P as its input. This component is configured to verify the sign of P, and deliver the value the half-cycle ambiguity as its output. As stated above, the calculation unit 20 may be configured to verify whether or not the absolute value of P is above a pre-defined threshold $P_{th}$. The sign of the half-cycle ambiguity is then only produced if $|P|>P_{th}$.

In the receiver channel of FIG. 2, the $L_{2P}$ PLL and DLL circuits 11 and 15 are still included. The DLL 15 again determines the delay $\Delta_{2P}-\Delta_{1P}$, while the output of the $L_{2P}$ PLL 11 is not further used in the receiver channel.

Figure 3:
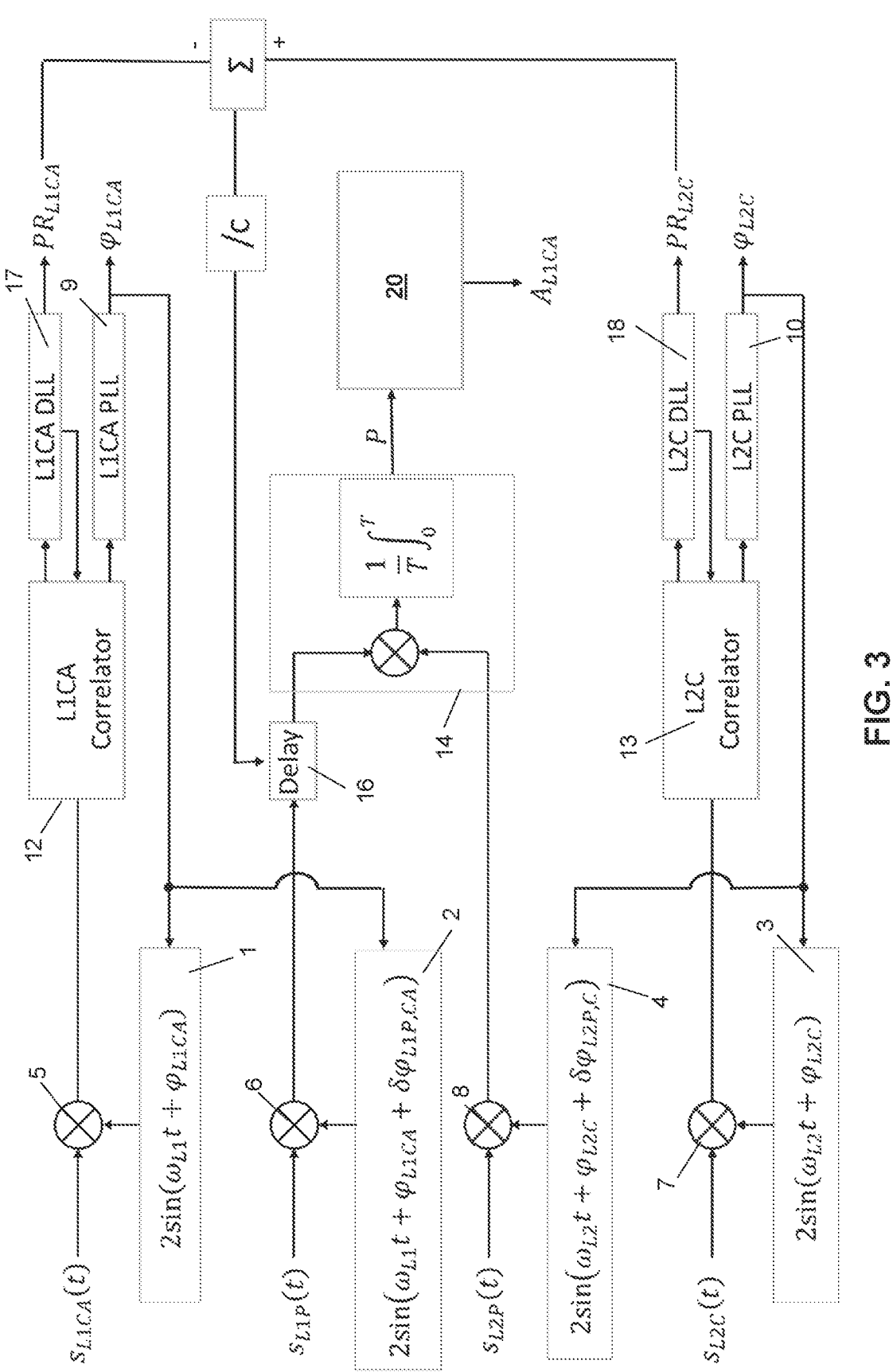

While this is a viable embodiment of a receiver channel according to the present disclosure, a more preferred embodiment is illustrated in FIG. 3. This embodiment corresponds to the following variation of the method according to the first embodiment.

In the context of this invention, the delay $\Delta_{2P}-\Delta_{1P}$ does not need to be known accurately: an accuracy of a few tens of nanoseconds is sufficient as the only requirement is to get a reasonable correlation level, not to accurately track the $L_{2P}$ signal. At that level of accuracy, the delay between the $L_{1P}$ and $L_{2P}$ signals is the same as the delay between the $L_{1CA}$ and $L_{2C}$ signals. If the receiver channel does not contain means to compute the $L_{1P}$-$L_{2P}$ delay $(\Delta_{2P}-\Delta_{1P})$, it is therefore sufficient to use the delay between $L_{1CA}$ and $L_{2C}$ instead $(\Delta_{2C}-\Delta_{1CA})$. A receiver channel implementing the present disclosure must at least track the $L_{1CA}$ and $L_{2C}$ signals, and therefore produce pseudorange and carrier phase measurements for those signals. The delay between $L_{1CA}$ and $L_{2C}$ is simply the difference between the $L_{2C}$ and $L_{1CA}$ pseudoranges, divided by the speed of light c. The method according to the first embodiment may therefore use the delay $\Delta_{2C}-\Delta_{1CA}$ instead of the delay $\Delta_{2P}-\Delta_{1P}$.

The receiver channel illustrated in FIG. 3 is suitable for executing the method of the first embodiment in accordance with the above-described variation, i.e. using the delay $\Delta_{2C}-\Delta_{1CA}$ instead of the delay $\Delta_{2P}-\Delta_{1P}$. This receiver channel does not comprise $L_{2P}$ DLL and PLL circuits. The delay applied to the downconverted $L_{1P}$ signal is obtained from the pseudoranges $PR_{L1CA}$ and $PR_{L2C}$ according to the formula: $\Delta_{2C}-\Delta_{1CA}=(PR_{L2C}-PR_{L1CA})/c$.

Figure 4:
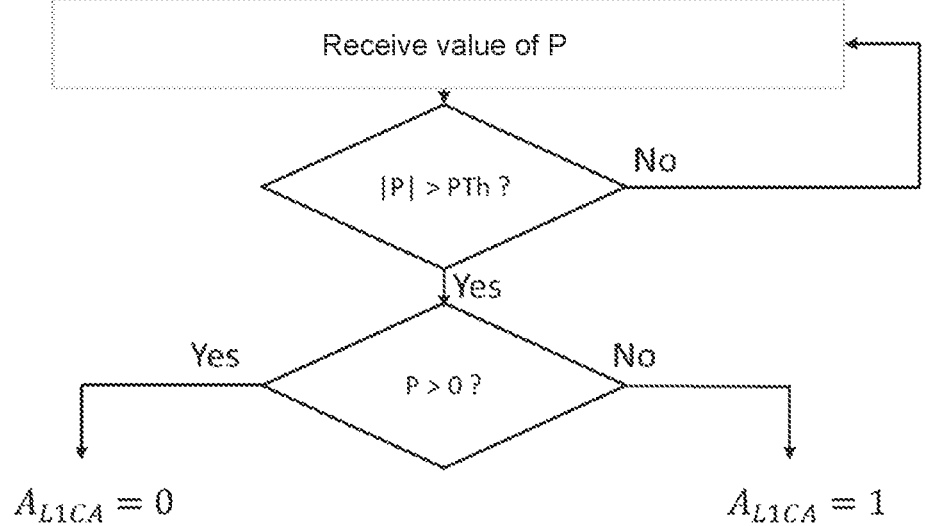
FIG. 4 is a flowchart illustrating the operation of an $L_{1CA}$ half-cycle ambiguity calculation unit applicable in a receiver channel configured for realizing the method according to the first embodiment.

A flowchart of the method steps applied by the half-cycle ambiguity calculation unit 20 including a check of the absolute value of P is shown in FIG. 4.

Compared to the prior art of FIG. 1, an important aspect of this embodiment of the present disclosure is that it does not require the $L_{1P}$ and $L_{2P}$ signals to be tracked by the receiver channel. All phase and delay information required to compute the cross-correlation between $L_{1P}$ and $L_{2P}$ are available from the $L_{1CA}$ and $L_{2C}$ phase and pseudorange measurements. The receiver according to the present disclosure must only perform a cross-correlation without implementing the necessary steps for tracking the P code (PLL and DLL). In particular, there is no need for the receiver to compute $L_{1P}$ and $L_{2P}$ code and carrier measurements. However, on receivers where $L_{2P}$ measurements are available, another option is possible, as described below.

Second Embodiment

There is another way of quickly determining the $L_{1CA}$ half-cycle ambiguity, applicable to receivers tracking the $L_{1CA}$ and $L_{2P}$ signals according to the state of the art and generating corresponding phase measurements. In a receiver channel tracking $L_{1CA}$ and $L_{2P}$ signals according to the state of the art (as shown in FIG. 1), the phase of the $L_{2P}$ carrier replica ($\omega_{L2}t + (\varphi_{L2P})$ is based on the output of the $L_{2P}$ phase-locked loop (PLL) 11. $\varphi_{L2P}$ is the $L_{2P}$ carrier phase measurement. The PLL 11 ensures that $\varphi_{L2P}$ equals the phase shift of $s_{L2P}$ of equation (1) with a half-cycle ambiguity $A_{L2P}$ (0 or 1) and an integer ambiguity $N_{L2P}$. $\varphi_{L1CA}$ and $\varphi_{L2P}$ are given by the following equations, again assuming perfect lock of the tracking loops to the signals:

$$\varphi_{L1CA} = \Phi_{L1} + N_{L1CA} \cdot 2\pi + A_{L1CA} \cdot \pi \qquad (5)$$

$$\varphi_{L2P} = \Phi_{L2} + \delta\varphi_{L2P,C} + N_{L2P} \cdot 2\pi + A_{L2P} \cdot \pi$$

The cross-correlation P in this case (neglecting the terms at twice the carrier frequency) obtained by integration of the product of the downconverted signals SLIP and $s_{L2P}$, taking into account the delay between the two signals, over a time T (as defined above), is the following:

$$P = G_{L1P}G_{L2P}(1 - 2A_{L1CA})(1 - 2A_{L2P}) \qquad (6)$$

As shown by equations (5), both the $L_{1CA}$ and $L_{2P}$ carrier phases are affected by half-ambiguities $A_{L1CA}$ and $A_{L2P}$. However, $A_{L1CA}$ and $A_{L2P}$ are linked by the sign of the cross-correlation P. From equation (6) it follows that if P is positive, $A_{L2P}=A_{L1CA}$, while if P is negative, $A_{L2P}=1-A_{L1CA}$. This allows to rewrite the $L_{2P}$ carrier phase as follows:

$$\varphi_{L2P} = \begin{cases} \Phi_{L2} + \delta\varphi_{L2P,C} + N_{L2P} \cdot 2\pi + A_{L1CA} \cdot \pi & \text{if } P > 0 \\ \Phi_{L2} + \delta\varphi_{L2P,C} + N_{L2P} \cdot 2\pi - A_{L1CA} \cdot \pi + \pi & \text{if } P < 0 \end{cases} \qquad (7)$$

The principles behind equation (7) have been known for long and are routinely applied to determine the $L_{2P}$ half-cycle ambiguity once the $L_{1CA}$ half-cycle ambiguity is determined (see for instance U.S. Pat. No. 6,061,390). However, it has so far not been recognized that equation (7) can be used for fast determination of $A_{L1CA}$ when the receiver also tracks the $L_{2C}$ signal in parallel to $L_{1CA}$ and $L_{2P}$. This is the basis of the second embodiment of the present disclosure.

When the receiver tracks $L_{2C}$, the carrier phase is given by (3), and the difference between $L_{2P}$ and $L_{2C}$ carrier phase measurements is given by:

$$\varphi_{L2P} - \varphi_{L2C} = \begin{cases} \delta\varphi_{L2P,C} + (N_{L2P} - N_{L2C}) \cdot 2\pi + A_{L1CA} \cdot \pi & \text{if } P > 0 \quad (8) \\ \delta\varphi_{L2P,C} + (N_{L2P} - N_{L2C}) \cdot 2\pi - A_{L1CA} \cdot \pi + \pi & \text{if } P < 0 \end{cases}$$

From equations (8), the $L_{1CA}$ carrier phase ambiguity can be readily derived from the $L_{2C}$ and $L_{2P}$ carrier phase measurements using the following quantity:

$$D = \frac{1}{\pi}(\varphi_{L2P} - \varphi_{L2C} - \delta\varphi_{L2P,C}) \qquad (9)$$

$$D = \begin{cases} 2(N_{L2P} - N_{L2C}) + A_{L1CA} & \text{if } P > 0 \\ 2(N_{L2P} - N_{L2C}) - A_{L1CA} + 1 & \text{if } P < 0 \end{cases} \qquad (10)$$

Considering that $N_{L2P}$, $N_{L2C}$ are integer values, equation (10) shows that, if P is positive, D is expected to be an even number if $A_{L1CA}$ is 0, and an odd number if $A_{L1CA}$ is 1. If P is negative, the opposite is true. In reality, due to noise on the carrier phase measurements, D will not be exactly an integer, but it should be close to an integer in good signal-to-noise conditions.

The determination of $A_{L1CA}$ according to this second embodiment of the present disclosure therefore involves:

Tracking the $L_{2P}$ and $L_{2C}$ signals according to the state of the art and generating the corresponding carrier phase measurements $\varphi_{L2P}$ and $\varphi_{L2C}$.

Computing D following equation (9) using the known phase difference $\delta\varphi_{L2P,C}$ between $L_{2C}$ and $L_{2P}$.

determining $A_{L1CA}$ from D by the following verification steps:

if the integer closest to D is even: $A_{L1CA}=0$ if P>0 or $A_{L1CA}=1$ if P<0 if the integer closest to D is odd: $A_{L1CA}=1$ if P>0 or $A_{L1CA}=0$ if P<0.

Figure 5:
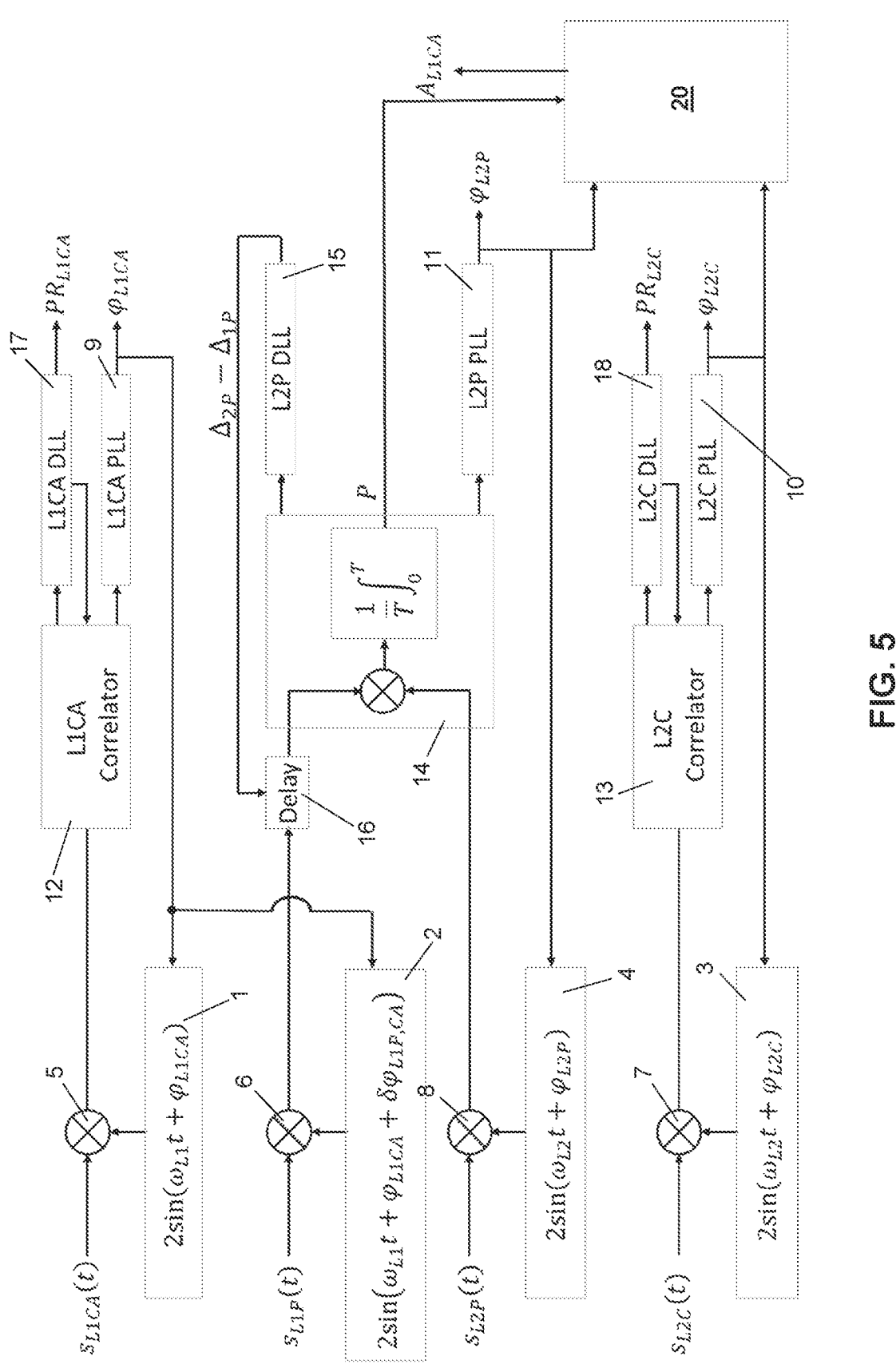
FIG. 5 illustrates a high-level architecture of a receiver channel of a GPS receiver applicable for realizing the method according to the second embodiment.
Figure 6:
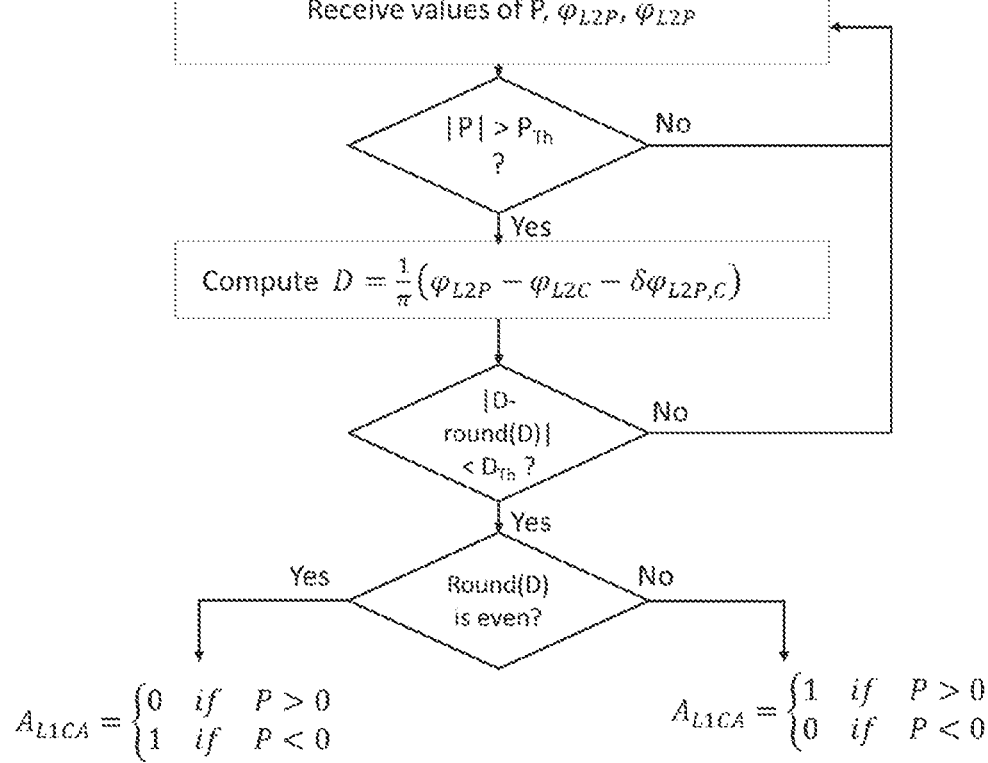
FIG. 6 is a flowchart illustrating the operation of an $L_{1CA}$ half-cycle ambiguity calculation unit applicable in a receiver channel configured for realizing the method according to the second embodiment.

A receiver channel configured for performing the method according to this second embodiment is represented in FIG. 5. This receiver channel requires a PLL circuit 10 for determining $\varphi_{L2P}$ as in the prior art shown in FIG. 1. With respect to the prior art in FIG. 1, this embodiment adds a $L_{1CA}$ half-cycle ambiguity calculation unit 20, taking the $L_{2C}$ and $L_{2P}$ carrier phases and the punctual cross-correlation value P as input. According to an alternative embodiment (not shown), the delay applied in circuit 16 of FIG. 6 is determined as $\Delta_{2C}-\Delta_{1CA}=(PR_{L2C}-PR_{L1CA})/c$, as in the embodiment illustrated in FIG. 4. In that case, the DLL circuit 15 of FIG. 5 could be omitted.

According to a preferred embodiment, a verification step precedes the determination of $A_{L1CA}$. This step consists in checking whether D differs from the closest integer by more than a threshold value $D_{Th}$, e.g. 0.1. The determination of $A_{L1CA}$ is then only done in the above-described way if D differs less than the threshold value $D_{th}$ from the closest integer. If D differs by more than $D_{th}$ from the closest integer, no decision can be taken as the noise is too large, and $A_{L1CA}$ is not determined until a next integration time T.

In the same way as in the first embodiment, a test on the amplitude of P ($|P|>P_{Th}$) is preferably added to avoid taking a decision based on noise. The flowchart shown in FIG. 6 shows the preferred operation of the half-cycle ambiguity calculation unit 20, when the tests for both D and P are included. A "cycle slip flag" can be raised when a change of $A_{L1CA}$ is observed.

As in the first embodiment, the method according to the second embodiment is preferably performed repeatedly as the signals of equation (1) are tracked so as to enable an essentially continuous monitoring of the half-cycle ambiguity. The determination of the cross-correlation P is done during consecutive integration times T, preferably shorter than the time between consecutive preambles, i.e. less than 6 s, for example 1s or even less. The method may be executed every time P is determined in this way. Every determination of P is then used together with a determination of the parameter D as input for the above-described method for determining the half-cycle ambiguity $A_{L1CA}$, preferably after an assessment of both P and D with respect to respective threshold values $P_{th}$ and $D_{th}$. However, other practical ways of realizing a repeated implementation of the method according to the second embodiment are possible. For example, the parameter D may be determined at the rate at which the carrier phase measurements $\varphi_{L2P}$ and $\varphi_{L2C}$ are updated, which may be for example 1 Hz or 10 Hz or any other suitable rate. The method can be performed at this same rate, by using each carrier phase update for determining D in combination with the latest determination of P.

In the method according to the second embodiment, a test of the carrier-to-noise density ratio (C/N0) can be added, and it can be decided not to take a decision if the C/N0 of the $L_{2C}$ and/or the $L_{2P}$ signal is under a given threshold.

In addition, it can be decided to only take a decision after a certain number of iterations provide consistent results. This can be done also when applying the method according to the first embodiment (FIGS. 3-5). The number of required iterations may be consecutive, for example $A_{L1CA}$ is the same after M consecutive determinations of $A_{L1CA}$, or non-consecutive, for example $A_{L1CA}$ is the same for N out of M determinations of $A_{L1CA}$.

In the same way as described above in relation to the method according to the first embodiment, the above method according to the second embodiment is preferably used in parallel to the legacy way of determining the half-cycle ambiguity from the sign of the preamble.

It is known in the art that the $L_{2P}$ PLL (11) can be designed to ensure that the sign of P is always positive. This option is compatible with the second embodiment of the present disclosure. In that case, the test of the sign of P in FIG. 6 can be bypassed as P is known to be positive by design.

While the present disclosure has been illustrated and described in detail in the drawings and foregoing description, such illustration and description are to be considered illustrative or exemplary and not restrictive. Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method for resolving the half-cycle ambiguity of a Global Positioning System (GPS) carrier phase, the method comprising:

receiving a plurality of signals from a GPS satellite, the plurality of signals including:

a first signal $L_{1CA}$ transmitted on a first carrier frequency $f_{L1}$, a second signal $L_{1P}$ transmitted on the first carrier frequency $f_{L1}$, the second signal having a known phase offset $\delta\varphi_{L1P,CA}$ with respect to the first signal, a third signal $L_{2C}$ transmitted on a second carrier frequency $f_{L2}$, and a fourth signal $L_{2P}$ transmitted on the second carrier frequency $f_{L2}$, the fourth signal having a known phase offset $\delta_{\varphi L2P,C}$ with respect to the third signal;

tracking the first signal and the third signal and determining thereby respective estimations of carrier phases $\varphi_{L1CA}$ and $\varphi_{L2C}$ of said first and third signals, wherein said estimation of the carrier phase $\varphi_{L1CA}$ of the first signal comprises the term $A_{L1CA}\cdot\pi$, wherein $A_{L1CA}$ is equal to 0 or 1, $A_{L1CA}$ being referred to hereafter as a half-cycle ambiguity of the $L_{1CA}$ carrier phase; and downconverting the second and fourth signals $L_{1P}$ and $L_{2P}$ to baseband by multiplication with a carrier replica of said second and fourth signals, determining a delay between the downconverted second and fourth signals, and determining a cross-correlation P between the downconverted second and fourth signals by integrating a product of the downconverted second and fourth signals over an integration time T, taking into account said delay;

wherein a positive or negative sign of the cross-correlation P and the known phase offsets $\delta_{\varphi L2P,C}$ and $\delta_{\varphi L1P,CA}$ are used for determining the half-cycle ambiguity $A_{L1CA}$ to generate a resolved half-cycle ambiguity; and based on the resolved half-cycle ambiguity, improving a downstream application utilizing the signals from the GPS satellite.

2. The method according to claim 1, wherein the half-cycle ambiguity $A_{L1CA}$ of the first signal $L_{1CA}$ is determined by:

executing said step of downconverting the fourth signal $L_{2P}$ by multiplication of the fourth signal $L_{2P}$ with a carrier replica having the phase $\omega_{L2}t+\varphi_{L2C}+\delta\varphi_{L2P,C}$, with $\omega_{L2}=2\pi f_{L2}$ determining the half-cycle ambiguity $A_{L1CA}$ of the $L_{1CA}$ signal directly from the sign of the cross-correlation P, according to the following verification steps:

if P is positive, $A_{L1CA}=0$, if P is negative, $A_{L1CA}=1$.

3. The method according to claim 2, wherein the delay between the downconverted second and fourth signals is determined by a delay lock loop (DLL) circuit (15) tracking the delay between $L_{1P}$ and $L_{2P}$.

4. The method according to claim 2, wherein the step of tracking the first signal and the third signal includes determining respective estimations $R_{L1CA}$ and $R_{L2C}$ of the satellite range, and wherein the delay between the downconverted second and fourth signals is a difference between the respective estimations of the satellite range obtained from the third and first signals $L_{2C}$ and $L_{1CA}$, divided by the speed of light, i.e. $(PR_{L2C}-PR_{L1CA})/C$.

5. The method according to claim 1, wherein the half-cycle ambiguity $A_{L1CA}$ of the first signal $L_{1CA}$ is determined by:

tracking the carrier phase $\varphi_{L2P}$ of the fourth signal by a tracking loop that maximizes an amplitude of the cross-correlation P, and executing said step of downconverting the fourth signal by multiplication of the fourth signal with a carrier replica having the phase $\omega_{L2}t+\varphi_{L2P}$; and from the sign of the cross-correlation P, and from the difference between $\varphi_{L2P}$ and $\varphi_{L2C}$, determining the half-cycle ambiguity $A_{L1CA}$ of the first signal $L_{1CA}$ according to the following steps:

determining a parameter D, with $$D = \frac{1}{\pi(\varphi_{L2P} - \varphi_{L2C} - \delta\varphi_{L2P,C})},$$

if the integer closest to D is even: $A_{L1CA}=0$ if P>0 or $A_{L1CA}=1$ if P<0, if the integer closest to D is odd: $A_{L1CA}=1$ if P>0 or $A_{L1CA}=0$ if P<0.

6. The method according to claim 5, further comprising: determining whether the absolute value of the difference between D and the closest integer is larger or smaller than a pre-defined threshold value $D_{th}$; wherein the step of determining the half-cycle ambiguity $A_{L1CA}$ of the $L_{1CA}$ signal is executed only if the absolute value of the difference between D and the closest integer is smaller than the pre-defined threshold value $D_{th}$.

7. The method according to claim 1, further comprising: determining whether the absolute value of P is larger than a pre-defined threshold value $P_{th}$; wherein the step of determining the half-cycle ambiguity $A_{L1CA}$ of the $L_{1CA}$ signal is executed only if $|P|>P_{th}$.

8. The method according to claim 1, wherein said method is performed repeatedly so as to enable an essentially continuous monitoring of the half cycle ambiguity $A_{L1CA}$.

9. The method according to claim 8, wherein the half-cycle ambiguity $A_{L1CA}$ is determined only if the same result is obtained a given number of times.

10. The method according to claim 1, wherein said method is performed repeatedly and wherein said method is performed in parallel with a method for determining the half-cycle ambiguity $A_{L1CA}$ on the basis of a preamble transmitted in the first signal and wherein the time between two consecutive determinations of the half-cycle ambiguity is smaller than the time between two consecutive preambles.

11. The method according to claim 1, wherein the time between two consecutive determinations of the half-cycle ambiguity is smaller than 6 s.

12. A method for processing Global Positioning System (GPS) signals, the method comprising: acquiring a plurality of signals from a GPS satellite, the plurality of signals including:
a first signal $L_{1CA}$ transmitted on a first carrier frequency $f_{L1}$,
a second signal $L_{1P}$ transmitted on the first carrier frequency $f_{L1}$, the second signal having a known phase offset $\Delta\varphi_{L1P,CA}$ with respect to the first signal,
a third signal $L_{2C}$ transmitted on a second carrier frequency $f_{L2}$, and
a fourth signal $L_{2P}$ transmitted on the second carrier frequency $f_{L2}$, the fourth signal having a known phase offset $\delta\varphi_{L2P,C}$ with respect to the third signal;

tracking the first signal and the third signal and determining thereby respective estimations of carrier phases $\varphi_{L1CA}$ and $\varphi_{L2C}$ of said first and third signals, wherein said estimation of the carrier phase $\varphi_{L1CA}$ of the first signal comprises the term $A_{L1CA}\cdot\pi$, wherein $A_{L1CA}$ is equal to 0 or 1, $A_{L1CA}$ being referred to hereafter as a half-cycle ambiguity of the $L_{1CA}$ carrier phase; and
downconverting the second and fourth signals $L_{1P}$ and $L_{2P}$ to baseband by multiplication with a carrier replica of said second and fourth signals, determining a delay between the downconverted second and fourth signals, and determining a cross-correlation P between the downconverted second and fourth signals by integrating a product of the downconverted second and fourth signals over an integration time T, taking into account said delay;
determining the half-cycle ambiguity $A_{L1CA}$ using a positive or negative sign of the cross-correlation P and the known phase offsets $\delta_{\varphi L2P,C}$ and $\delta_{\varphi L1P,CA}$ thereby generating a resolved half-cycle ambiguity; and
based on the resolved half-cycle ambiguity, detecting half-cycle slips during acquisition and processing of the GPS signals.

13. A GPS receiver comprising one or more receiver channels, each channel being configured to track the following four signals from a GPS satellite:
a first signal $L_{1CA}$ transmitted on a first carrier frequency $f_{L1}$,
a second signal $L_{1P}$ transmitted on the first carrier frequency $f_{L1}$, the second signal having a known phase offset $\delta\varphi_{L1P,CA}$ with respect to the first signal,
a third signal $L_{2C}$ transmitted on a second carrier frequency $f_{L2}$,
a fourth signal $L_{2P}$ transmitted on the second carrier frequency $f_{L2}$, the fourth signal having a known phase offset $\delta\varphi_{L2P,C}$ with respect to the third signal;
wherein at least one of said channels comprises a half-cycle ambiguity calculation unit (20) configured to calculate the half-cycle ambiguity $A_{L1CA}$ of the $L_{1CA}$ signal in accordance with the method of claim 1.

14. The method of claim 1, wherein improving the downstream application comprises recovering positioning accuracy with respect to the GPS satellite after an interruption of the plurality of signals.

15. The method of claim 1, wherein improving the downstream application comprises faster restoration of integer-ambiguity carrier phase after a signal slip.

* * * * *